US009503502B1

(12) United States Patent
Carlson et al.

(10) Patent No.: US 9,503,502 B1
(45) Date of Patent: *Nov. 22, 2016

(54) FEEDBACK MECHANISMS PROVIDING CONTEXTUAL INFORMATION

(71) Applicant: Amazon Technologies, Inc., Reno, NV (US)

(72) Inventors: Adam Carlson, Seattle, WA (US); Joseph C. Lee, Seattle, WA (US); David Erdmann, Edmonds, WA (US)

(73) Assignee: Amazon Technologies, Inc., Reno ( * ) Notice: Subject to any disclaimer, the term of this patent is extended or adjusted under 35 U.S.C. 154(b) by 247 days.

This patent is subject to a terminal disclaimer.

(21) Appl. No.: 14/094,701

(22) Filed: Dec. 2, 2013

Related U.S. Application Data

(60) Continuation of application No. 13/586,419, filed on Aug. 15, 2012, now Pat. No. 8,601,095, which is a division of application No. 12/750,252, filed on Mar. 30, 2010, now Pat. No. 8,266,243.

(51) Int. Cl.
| | |
|---|---|
| *G06F 15/16* | (2006.01) |
| *G06F 15/173* | (2006.01) |
| *H04N 7/16* | (2011.01) |
| *H04N 7/025* | (2006.01) |
| *G06F 13/00* | (2006.01) |
| *H04N 5/445* | (2011.01) |
| *H04N 7/173* | (2011.01) |
| *H04L 29/08* | (2006.01) |

(52) U.S. Cl.
CPC .................................... *H04L 67/02* (2013.01)

(58) Field of Classification Search
CPC . H04L 63/14; H04L 63/145; H04L 63/1433; H04L 63/1483; H04L 12/585; H04L 12/5855; H04L 67/02; H04L 67/20

USPC ........................ 709/202, 217, 224, 226, 246; 725/22–26, 32–33, 56, 105, 109
See application file for complete search history.

(56) References Cited

U.S. PATENT DOCUMENTS

| | | |
|---|---|---|
| 7,814,542 B1 | 10/2010 | Day |
| 7,823,204 B2 | 10/2010 | Gupta et al. |

(Continued)

OTHER PUBLICATIONS

USPTO Notice of Allowance dated Aug. 16, 2013, U.S. Appl. No. 13/586,419, filed Aug. 15, 2012, 10 pages.

(Continued)

*Primary Examiner* — Farzana Huq
(74) *Attorney, Agent, or Firm* — Hogan Lovells US LLP

(57) ABSTRACT

Feedback received from users regarding potential problems with an application, service, or other source of electronic content can be configured to include additional information that help triangulate the source of the problem. Content provided by third parties can be combined with content from a primary provider, but the primary provider often will be unable to determine the precise instance of third party content that a user received that might have posed a problem for the user, as may relate to malware or another such issue. By configuring feedback submissions from users to automatically include identifying information, and by logging session data for various users, a content provider can analyze and filter the data to determine likely sources of the problem, and deactivate or otherwise address those sources. Further, the content provider can analyze the information to locate any users likely to have been exposed to the same third party content.

17 Claims, 5 Drawing Sheets

(56) References Cited

U.S. PATENT DOCUMENTS

| | | |
|---|---|---|
| 7,940,654 B2 | 5/2011 | March |
| 8,090,816 B1 | 1/2012 | Deshmukh |
| 8,516,590 B1* | 8/2013 | Ranadive ............ H04L 63/1483 713/187 |
| 8,813,232 B2* | 8/2014 | Sreedharan ............ G06F 21/00 705/14.73 |
| 2007/0204033 A1 | 8/2007 | Bookbinder et al. |
| 2007/0234213 A1* | 10/2007 | Krikorian ........ H04N 21/23406 715/716 |
| 2007/0238437 A1* | 10/2007 | Jaakkola ........... H04W 52/0251 455/343.1 |
| 2008/0028444 A1* | 1/2008 | Loesch ............. G06F 17/30902 726/4 |
| 2009/0013054 A1* | 1/2009 | Libbey ................. G06Q 10/107 709/207 |
| 2009/0327084 A1* | 12/2009 | Patton .................... G06Q 30/02 705/14.73 |
| 2010/0115621 A1* | 5/2010 | Staniford ............ H04L 63/1416 726/25 |
| 2010/0281539 A1 | 11/2010 | Burns et al. |

OTHER PUBLICATIONS

USPTO Non-Final Office Action dated Jan. 29, 2013, U.S. Appl. No. 13/586,419, filed Aug. 15, 2012, 11 pages.

USPTO Notice of Allowance dated May 15, 2012, U.S. Appl. No. 12/750,252, filed May 15, 2012, 14 pages.

\* cited by examiner

| Network | Page | Ad provider | Time | Region | Details |
|---|---|---|---|---|---|
| foo.com | electronics/today | adz.com | 12:03 | Canada | Malmare report |
| acme.com | todaysdeals | adx.com | 03:53 | US West | Phishing email |
| acme.com | account | clickme.com | 10:34 | US Mid | Virus |
| acme.com | news/daily | adx.com | 20:11 | US East | Malware report |
| foo.com | toys/toddlers | adz.com | 23:11 | Mexico | Malware report |
| acme.com | todaysdeals | adx.com | 03:51 | US West | Phishing email |
| foo.com | toys/toddlers | adz.com | 22:58 | Mexico | Malware report |
| foo.com | toys/electronics | clickme.com | 23:07 | US West | Malware report |
| acme.com | sports/scores | adz.com | 00:43 | Mexico | Malware report |

FIG. 5

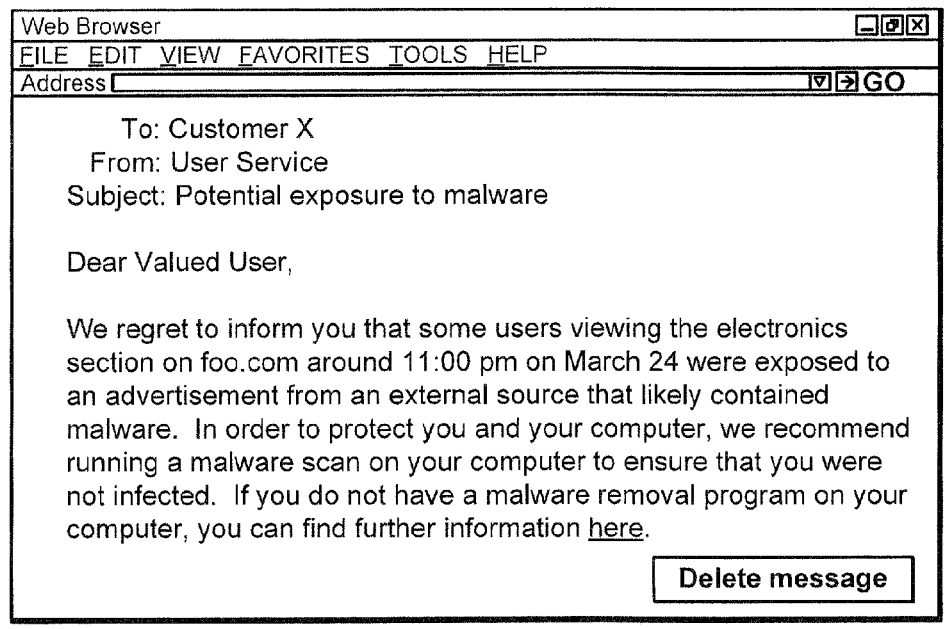

FIG. 6

FEEDBACK MECHANISMS PROVIDING CONTEXTUAL INFORMATION

CROSS REFERENCE TO RELATED APPLICATION

The present application is a continuation of, and claims priority to, pending U.S. patent application Ser. No. 13/586,419, entitled "Feedback Mechanisms Providing Contextual Information" filed Aug. 15, 2012, which is a divisional of allowed U.S. patent application Ser. No. 12/750,252, filed Mar. 30, 2010, the entire disclosure of each of which is incorporated herein by reference.

BACKGROUND

As there is an increasing number of users viewing information and obtaining items and services electronically, there is a corresponding increase in the amount and variety of content provided to users. In some cases, different types of content can be provided from multiple sources and viewable concurrently, such as on the same page of content. When a primary provider of a page such as a Web page includes content from other sources, such as advertisers or other third party providers, the primary provider often loses at least some control over the specific content provided by those sources. In the case of advertising, for example, many content providers work with an advertising entity that manages advertisements to be displayed or otherwise included with that provider's content. In order to display ads that are likely to be relevant to the user viewing the content, the provider may specify a category, type of content, user information, or other appropriate types of information relating to the viewing of content by the user. An advertiser or other such content provider can then select an ad, type of ad, or other supplemental content that is likely at least somewhat of interest to the user.

In many cases, however, the primary content provider will only have control over the selection of the advertising entity and the information provided to select the advertising, and may not have any control over the specific advertising that is ultimately selected and/or displayed. Further, the primary content provider may have no way of determining which third party content was actually displayed to users on their private devices, for example. A problem that can occur in such a situation is that this supplemental content provided by another party can potentially contain arbitrary HTML, JavaScript, Flash, or similar code that may contain malware or other potentially malicious script. Since the primary content provider does not have any access to, or control over, the supplemental content, the primary content provider will often not have the ability to detect the malicious code before the code is loaded onto the user device.

Further, the content provider typically only becomes aware of potential problems when users complain or otherwise notify the provider of the problem. A user might submit a message through a standard support channel that antivirus software on the user's computer detected malware, for example, but the submitted message will often have little additional information necessary to determine the source of the problem. Because the primary content provider cannot quickly determine the source of the problem, the provider might be forced to turn off or restrict advertising or other supplemental content for a period of time necessary to ensure that the problem is addressed. Removing advertising and other third party content from a site for a number of days can result in a significant loss of revenue, degraded user experience, and other such issues. Further, such a solution is not scalable for a number of different reasons.

BRIEF DESCRIPTION OF THE DRAWINGS

Various embodiments in accordance with the present disclosure will be described with reference to the drawings, in which:

FIG. 5 illustrates an example of feedback information that can be collected and analyzed in accordance with various embodiments;

FIG. 6 illustrates an example display of an instructional message that can be sent to users in accordance with various embodiments.

DETAILED DESCRIPTION

Figure 1:
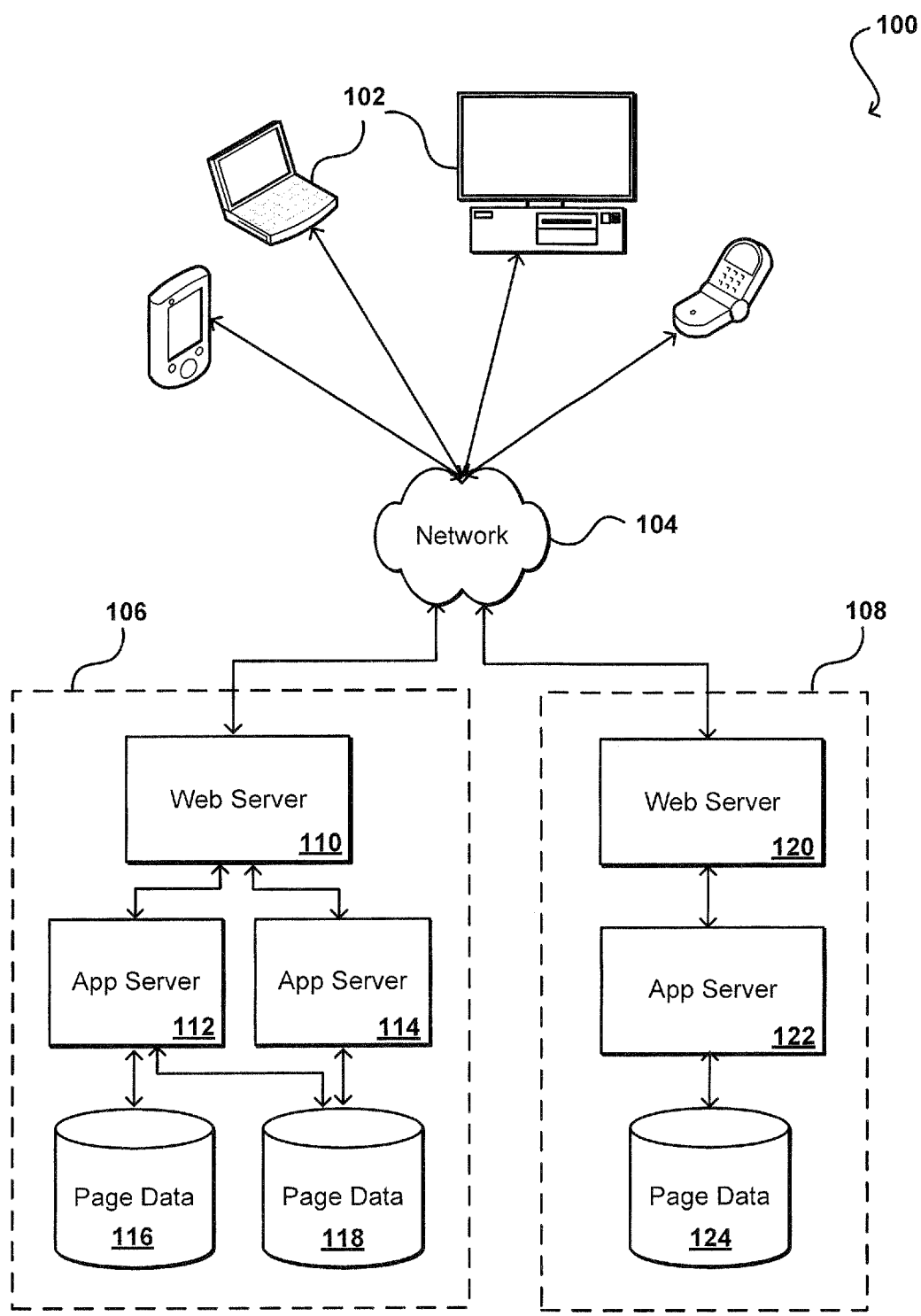
FIG. 1 illustrates an environment in which various embodiments can be implemented.

Systems and methods in accordance with various embodiments of the present disclosure may overcome one or more of the aforementioned and other deficiencies experienced in conventional approaches to troubleshooting or locating suspect supplemental or third party content in an electronic environment. In particular, users may submit feedback to a system or service through at least one of a variety of different mechanisms. Each feedback mechanism can be configured to automatically include identifying or other relevant information with each submission, which can be used to help identify a source of a potential issue being reported with the feedback submission. The identifying information can include any appropriate information, such as a user or session identifier, a timestamp corresponding to some aspect of the session, page history information, geographical location information, browser version, client device type, or other such information.

A system or service receiving the feedback submission can parse and/or analyze the submission to locate the identifying information and any relevant information provided by the user, such as the type of problem, etc. This information can be stored to a feedback data store or other appropriate location for subsequent analysis, as a content provider with a large number of users might require that a specified rule or criterion be satisfied before the problem is to be investigated. For example, a threshold or minimum number of users might need to report a problem to trigger an investigation, or a minimum frequency or rate of reporting might be required, as at any time a number of users will experience problems such as viruses or malware that were obtained from other sources. The content provider also can store session information, browsing history, or other such information for users, at least for a minimum period of time.

When a feedback analysis module or other component of the content provider system determines that a significant number of users have reported a similar problem, as may be determined by analysis of the data in the feedback data store, for example, the feedback analysis module can launch an investigation into the reported problem. In some embodiments, data is joined from the session data logs and the feedback data store in order to obtain records corresponding to users reporting the problem, the records containing a variety of parameters useful in triangulating or otherwise determining a potential source of the reported problem. In one embodiment, the parameter values specify information such as networks or domains to which each user was exposed, pages the users viewed, third party content providers that were selected for those pages, any parameters passed to the third party content providers, and/or timestamps identifying the approximate times at which the user viewed any third party content via the primary content provider pages, site, code, etc.

The joined data can be analyzed and/or filtered in order to reduce the data down to those records that contain common information that might be of use in locating the problem, such as a common period of time and ad provider. In at least some embodiments, the various combinations of parameters can be analyzed and ranked such that an application or user can quickly determine which parameter(s) likely correspond to the source of the problem. In some embodiments, the system can automatically take action when a parameter value exceeds a specified certainty threshold. In various embodiments, an authorized user will be able to view the ranked parameter values and determine appropriate actions to be taken. Various other actions and approaches can be used as well as described below with respect to the various embodiments.

While the examples below often refer to advertisements for simplicity of explanation, it should be understood that various other types of supplemental or targeted content, such as games, video, audio, text, and/or other such types of content, can be provided from other domains, providers, or entities as well, using any of a variety of approaches. In some cases, this content from a separate entity will be referred to as "supplemental content" or "customized content." It thus should be apparent that the use of advertising and advertising-related descriptions with respect to the various embodiments should not be interpreted as a limitation on the scope, advantages, or applicability of the various embodiments.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes a variety of electronic client devices 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. Each client device can be capable of running at least one motion or orientation-controlled interface as discussed or suggested herein. In some cases, all the functionality for the interface will be generated on the device. In other embodiments, at least some of the functionality or content will be generated in response to instructions or information received from over at least one network 104. The network 104 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a primary content provider 106 and a supplemental content provider 108. Each provider can include at least one Web server 106 for receiving requests from a user device 102 and serving content in response thereto, although for other networks an alternative device serving a similar purpose could be used as would be apparent to one of ordinary skill in the art.

Each content provider in this illustrative environment includes at least one application server 112, 114, 122 or other such server in communication with at least one data store 116, 118, 124. It should be understood that there can be several application servers, layers, and/or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. An application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and an application server, can be handled by the respective Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

Each data store can include several separate data tables, databases, or other data storage mechanisms and media for storing data relating to a particular aspect. For example, the page data store 116 illustrated includes mechanisms for storing page data useful for generating Web pages and the user information data store 118 includes information useful for selecting and/or customizing the Web pages for the user. It should be understood that there can be many other aspects that may need to be stored in a data store, such as access right information, which can be stored in any of the above listed mechanisms as appropriate or in additional mechanisms in the data store. Each data store is operable, through logic associated therewith, to receive instructions from a respective application server and obtain, update, or otherwise process data in response thereto. In one example, a user might submit a search request for a certain type of content.

In this case, the data store might access the user information to verify the identity of the user, and can access the content information to obtain information about instances of that type of content. The information then can be returned to the user, such as in a results listing on a Web page that the user is able to view via a browser on the user device 102. Information for a particular instance of content can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
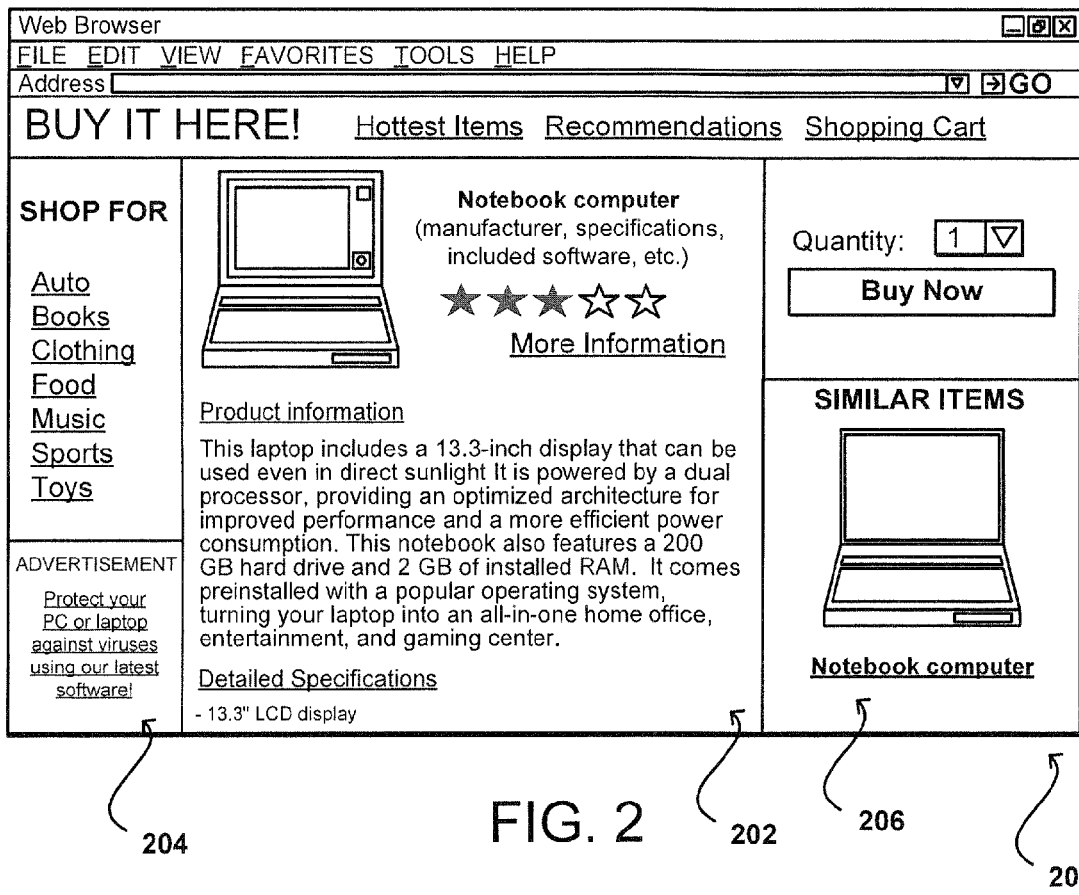
FIG. 2 illustrates an example display of content including content from third parties that can be used in accordance with various embodiments.

FIG. 2 illustrates an example of a page 200 that could be generated by a system such as that illustrated in FIG. 1. In this example, the page includes a number of sections (e.g., frames in a frameset) that each display content derived from a specific location (e.g., a specified uniform resource locator (URL)). As shown, the sections can provide different content and/or functionality, such as providing information about an item 202, as well as options such as the ability to purchase the item, the ability to navigate to other content, etc. As discussed, this functionality can be provided from different domains or sources. For example, the page 200 shown in FIG. 2 includes a section with advertising 204 that might be provided by a third party advertiser based on information such as a category of the page which is being displayed. The page 200 also includes a section for displaying related products 206, which could be provided by another provider, network, or domain.

In some cases, content providers will use separate frames for specific sections because many conventional browsers or other such interface applications do not allow for cross-domain communication. Thus, while a primary content provider might want to display an ad or other type of supplemental content from another domain on that page, the provider may not want that domain to have any control over, or ability to modify, the content from the other domains. This not only gives the content provider control over what is displayed on the page (other than, to some degree, the specific content from the other domain), but reduces the risk for malicious attacks from the other domain or persons mimicking requests from the other domain.

While the use of elements such as frames protects the primary content provider from attacks by entities in other domains, such elements also prevent the primary content provider from having significant control over the content sourced from the other domain. Further, the primary content provider typically cannot even view into the other domain on the page, such that the primary content provider cannot determine or log the specific ads or other content that are displayed on the page.

Figure 3:
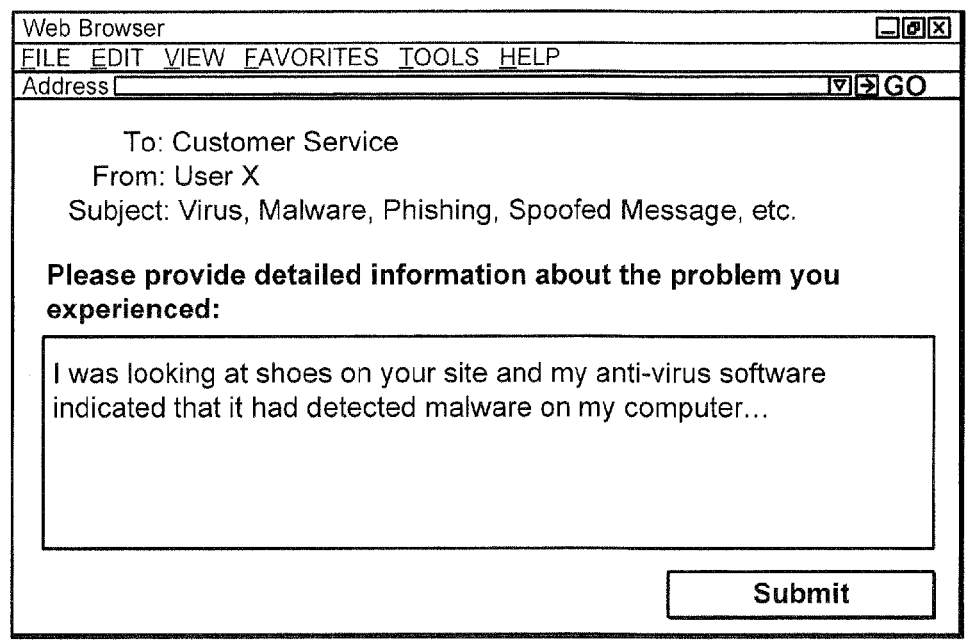
FIG. 3 illustrates an example of a feedback message generation interface page that can be utilized in accordance with various embodiments.

As mentioned above, primary content providers often do not discover potentially harmful third party content (e.g., advertisements) until the provider receives a complaint or other type of notification from a user or other user of the site, viewer of the content, etc. FIG. 3 illustrates an example of a feedback submission form 300 that might be provided today to a user wanting to report suspected malware or a problem to the content provider. The submission form 300 provides only basic information, such as a user identity (e.g., User X) and a simple subject line that does not provide much detail about the problem experienced by the user. The user can also provide, via a text element or other such input mechanism, a brief description of the problem.

As discussed, however, such information typically is not very helpful in determining the source of the problem. For example, the system might not be able to determine the time when the problem occurred, such that even if the system can lookup user activity there is no way to know which activity might have exposed the user to the risk. Further, a general message might not provide enough information to determine the actual user (e.g., which "John Smith"), such that any stored information can be of little assistance. Oftentimes, the primary content provider denies users access to specific content, such as advertising, until the problem is resolved. This can require contacting the advertising entity and attempting to locate the problem content, for example, which can take days or even weeks. As discussed, the inability to provide content such as advertising for an extended period of time can result in a significant reduction in revenue and other such issues.

Figure 4:
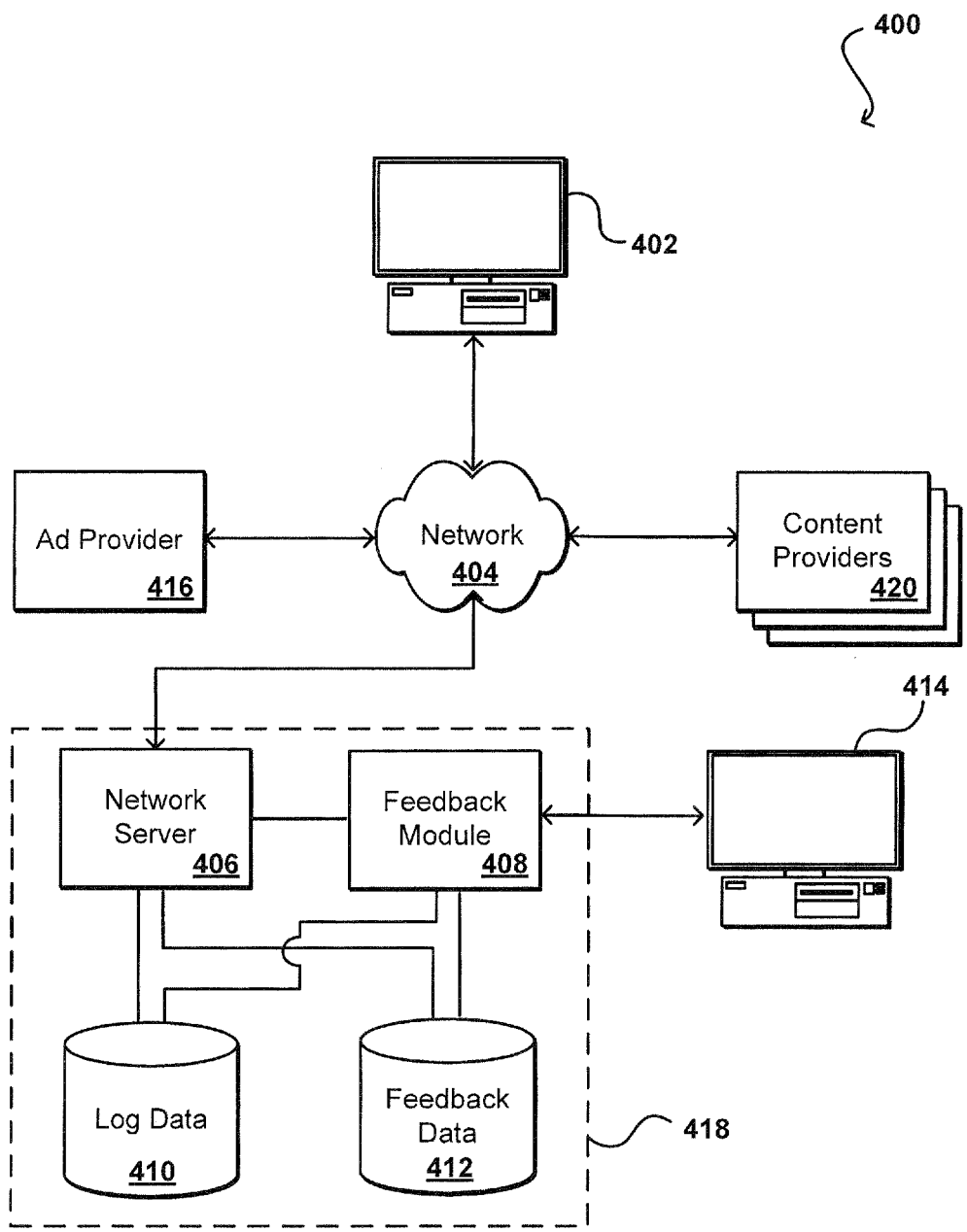
FIG. 4 illustrates an example configuration for collecting and analyzing feedback information that can be used in accordance with various embodiments.

Systems and methods in accordance with various embodiments address at least some of these and other concerns with respect to troubleshooting or triangulating suspect supplemental content by automatically including information with user feedback submissions, or other such submissions, that can be helpful in triangulating the problematic third party content. FIG. 4 illustrates an example configuration 400 whereby a user, suspicious of certain content, can submit feedback information to a primary content provider 418 that the primary content provider can use to determine the source of the content being reported by the user as suspicious. It should be understood that this diagram illustrates only an example selection of basic components, and that any other appropriate components utilized for such purposes can be utilized as well within the scope of the various embodiments as discussed herein. A user of a client device 402 can cause a request to be sent from the client device 402 to the primary content provider 418. In response to the request, the primary content provider 518 can provide content to be rendered on the client device 402, and can include code (e.g., at least one URL) that can cause supplemental content from a third party such as an advertising entity 416 to be displayed with the content from the primary content provider.

In this example, a network server (or another appropriate device, system, or log aggregation service, for example) can cause information about the content served to the client device 402 to be stored to at least one logging data store 410 or other appropriate repository or location. The information logged can include any appropriate information, such as a user or session ID, a timestamp, information corresponding to the general location of the user (e.g., an IP address), identification of the primary content displayed to the user (e.g., at least a portion of the URL of the primary page being viewed), identification of a source of supplemental content displayed to the user, as well as any information provided to a third party content provider in order to select the supplemental content. As should be apparent any other appropriate selection of content can be used as well within the scope of the various embodiments. The logging also can be stored for any appropriate amount of time, such as for an hour, a day, or a week, as may depend at least in part upon the amount of traffic or other such factors.

If a user, while viewing a site, notices any problems or issues and the user wishes to convey the problem to the primary content provider 418, the user can send a request from the client device 402 across at least one network (e.g., a cellular network and/or the Internet) to the primary content provider. The content provider, in response to receiving the request, can return a feedback submission form to be displayed on the client device 402. The user may complete and submit the form back to the content provider. While the user completes the from (or after the form is completed), client-side code (e.g., JavaScript) on the client's browser can cause form data or another appropriate submission data to be generated that includes the additional feedback information, such as the user or session ID and other information discussed above. The submission data will be received by the content provider across the network 404. The content provider may then process the submission and cause feedback information for the submission to be stored to a feedback data store 412 or other appropriate repository or location.

In some embodiments, the feedback information will be passed to a feedback module 408 before, or along with, the information being stored to the feedback data store 412. In some embodiments, the feedback module will analyze each submission as it is received, in order to determine if any problem exists that needs to be addressed. In other embodiments, the information is stored to the feedback data store 412 which acts, at least in part, as a job queue which is analyzed (regularly, periodically, randomly, or upon manual activation) by the feedback module 408 to determine if any issues exist that require investigation.

In many cases, a single submission may not be significant enough to trigger an investigation. For example, a content provider may have hundreds of thousands or even millions of users. In this case, the content provider might choose to not investigate an issue until a threshold number of users provide feedback reports. Further, a content provider might choose not to investigate until it determines that the reports are sufficiently related (e.g., likely originate from the same source). For example, suppose ten users are viewing content provided from the same content provider (e.g., all users are viewing a single page or multiple pages) and each user reports a malware problem. Upon determining that there are no common traits (or very few common traits) between reports, the content provider may determine that it is likely that the users picked up the malware from sources other than via the content provider, as any percentage of client devices at any given time will have malware, viruses, etc. On the other hand, suppose hundreds of users within a short period of time all report the presence of malware to the content provider, and all (or most of) the users were viewing the same category of information and received supplemental content from the same third party source, the system can determine that a problem is highly likely to correspond to the provided content and can even turn off content from that specific provider, for that category, etc., until the source is properly identified.

When the feedback module (or another such module or process) determines that an investigation should be launched, the module (or another module or service, for example) can begin to analyze the related feedback data, such as to go through the feedback data store 412 to find entries that are potentially related to the issue. The feedback module also can perform a "join" operation or otherwise access the corresponding information in the log data store 410. As discussed, log information can be stored for each user when the user accesses content, such that when a user feedback record is accessed the system can pull up the corresponding entries for that user from the log data.

In some embodiments, the system can run at least one filtering pass over the resulting data (including feedback and log data) to attempt to remove records that do not have at least a minimum number or type of common aspects. For example, there might be 15 users who submitted malware reports, but after analyzing the log data only 10 of them accessed the content within a specified window of time, such that at least some of the feedback entries can be excluded from consideration.

In one example, a user is required to login to a site or system in order to provide feedback, which can enable information such as a unique identifier (e.g., a session identifier (ID) or user ID) to be attached to, or otherwise associated with, the feedback. If the system also stores a log of activity for that user, the system can quickly determine types and/or sources of content to which the user was exposed. When feedback is received from multiple users, that information can be analyzed to determine the intersection of common traits, which can help to rapidly pinpoint one or more potential sources of the problem.

One advantage to such an approach is that it requires little to no extra work on the part of the user. The user can simply submit a feedback message using essentially the same approach that was used previously, but additional information can be submitted with the message (e.g., in metadata or form sections/tags) without the user having to have any knowledge of the additional information. In some situations, the browser or other interface application on the client device might at least temporarily store information that can also be submitted with the request, such as might relate to activity in a current session, etc. Further, while discussed primarily with respect to malware and other such malicious code or activities, it should be understood that such approaches also can be used to diagnose other issues as well. For example, a particular piece of content might take a particularly long time to load, or cannot be loaded for any of a number of reasons. Appropriate information can be submitted with feedback for any of these issues, which can help to locate the source of the problem or at least assist in diagnosis.

In one triangulation example, a time filter is first executed on the data in order to quickly exclude a large number of records that do not apply to the period at issue. A second filter can be based on user or session ID, for example, in order to locate user indicating specific problems as reported by the feedback data. Another filter can remove any information that is not relevant to the current problem. A resulting file can include a specified set of dimensions for the users having submitted similar problems. The information then can quickly be analyzed to determine common dimension values, etc., and generate match scores for each dimension or combination of dimensions. Each attribute or dimension value, or combination thereof, then can be ranked by percentage or other parameter as likely identifying a potential source of the problem. Similar processes can be used at the logging stage to ensure that appropriate information is being captured. Further, if certain information is identified as being a likely source of the problem, subsequent information logged with those criteria can include additional and/or more detailed information to assist with the analysis.

In some embodiments, as discussed above, the primary content provider system might automatically determine to shut off or disable at least a portion of the content selection functionality. For example, if ads from a particular source are determined to contain malware the content provider system could decide to at least temporarily restrict content from being selected from that source. If ads for a particular type of content (e.g., electronics) are determined to be problematic, then ads could be turned off for pages with that particular type of content.

In some embodiments, at least some of the decisions to turn off or at least temporarily disable content are performed manually, or with human intervention. An authorized user (herein referred to as the "troubleshooter") can logon to a user terminal 414 or other appropriate device for accessing the aggregated log and feedback data. In some embodiments, a specific user interface is generated that enables the troubleshooter to view the information, as well as to perform various reporting, filtering, or analytical operations on the data. From the UI, the troubleshooter also can have the ability to perform and/or recommend actions based at least in part on the feedback data. In some embodiments, the recommendations are sent to a supervisor for approval. The troubleshooter and/or supervisor can each be contacted with updates, such as the initial need for review, the recommendation, action being taken, status updates, etc. The updates can be sent using any appropriate technology, such as email, instant messaging, texting, paging, etc. The same or a similar UI also can be used to enable the type of content to again be accessed once the issue is cleared.

In some embodiments, the system can contact the ad provider 416 to obtain and/or provide information about an issue. In some embodiments, the system (or the troubleshooter) can request information to help identify the problem. In some embodiments, a third party provider 420 can be contacted when the issue is identified, in order to inform the third party provider of the issue and request that the provider correct the issue. The third party provider also can be required to contact the primary content provider once the issue is resolved in order to get the supplemental content from that provider turned back on. In some embodiments, a third party provider also could be asked to track certain data, such as content identifiers or other information provided to users, to assist in determining the content at issue. A third party provider will likely be willing to help, because any time spent locating a problem could be time when that provider's content is restricted, such that the third party provider is losing a revenue stream.

Further, multiple content providers 420 and/or other third party entities might be willing to combine data in order to more quickly and accurately locate or determine potential problematic content. In some embodiments at least some of the third party content providers 420 will collect their own log data and feedback data. Data from the various providers can be joined and analyzed to determine common aspects, as an advertisement from a third party ad provider 416 might have been displayed with content provided by at least a portion of the third party content providers 420, as well as the primary content providers. In some cases, a centralized service (e.g., provided by the primary content provider 418, one of the third party providers 420, or other designated entity) can receive information from each provider subscribing to the service (e.g., via at least one API) and analyze the combined data to determine potentially problematic content. That service can send notifications to each provider where at least one of the viewers of content from that provider might have been exposed to the problematic content, as may be based at least in part upon session data for that provider. The centralized service also can provide notifications to other appropriate parties, such as to the ad provider 416. The information provided to the centralized service can be selected, filtered, scrubbed, or otherwise processed prior to being sent to the centralized service in order to remove any potentially sensitive or confidential information, such as an user-specific identity information.

FIG. 5 illustrates an example table 500 for at least temporarily storing feedback and additional information in accordance with one embodiment, which can be viewed by the troubleshooter through the UI on the terminal 414. As can be seen in this example, each entry includes information such as the network or domain from which the primary content was served, as well as identities of each relevant page which the user was accessing. The information also can store at least one timestamp or time range when the user accessed the content, as well as a general region from which the user accessed the content. The information can also list each advertising entity or third party that provided content for that user, and any information identifying the type of problem. The information in some embodiments can list the type of device and/or browser used to view the information, or the connection speed at which the user accessed the information, as different types of content might be selected for different users based on factors such as capability, capacity, speed, size, etc. Various other types of information can be included as discussed and suggested elsewhere herein.

Upon determining a likely source of a problem, a troubleshooter (or other person or process) can also cause the system to go back through the log data in the log data store 410 to attempt to determine users who shared the same characteristics as those who experienced the problem, and thus might also have been exposed to the problem but might not yet be aware of the issue. In some embodiments, the system can cause a notification to be sent to each such user, indicating the likelihood that the user was exposed to the problematic content. FIG. 6 illustrates an example of such a notification 600, wherein a user can be notified of the occurrence of the problem, an explanation of the problem, why the user should care, and/or how the user can protect against further potential harm. In some cases, a user might be offered a credit or other compensation item. Various other types of information can be included as well as should be apparent.

Figure 7:
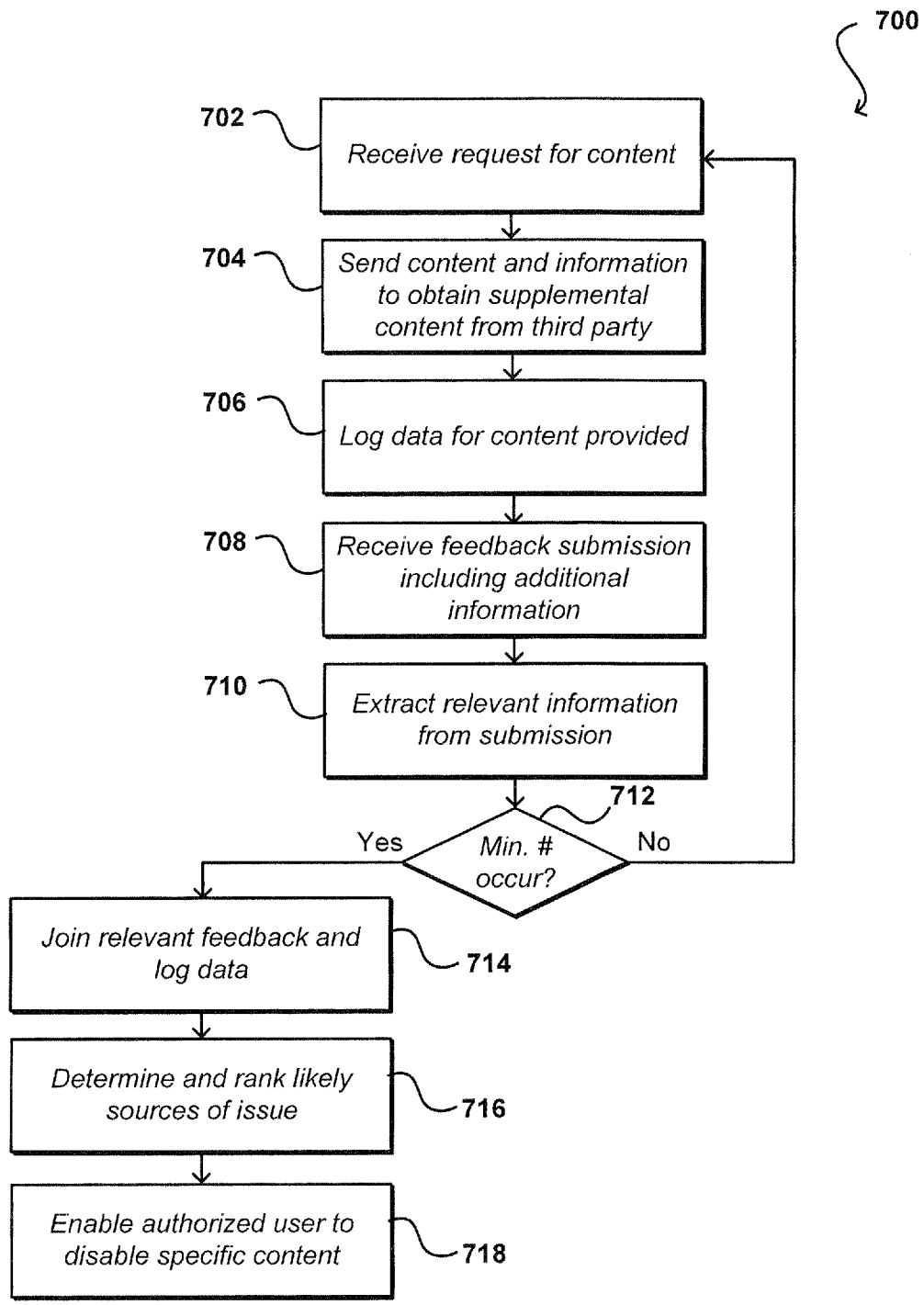
FIG. 7 illustrates an example process for determining the source of problem code in accordance with at least one embodiment.

Using components such as those described above, FIG. 7 illustrates an example process 700 for determining the likely source of an issue such as malware infection in accordance with various embodiments. As discussed, a content provider can receive one or more requests for content from any of a plurality of users 702. For each request, the provider system can attempt to locate primary content to satisfy the request, as well as supplemental content that might be provided by another source, and send the primary content and information identifying the supplemental content in a response of an appropriate format 704. In at least some embodiments, this can involve receiving a request from a user via a Web browser on a client device and returning HTML or other code that can be rendered in the browser application. The HTML can include one or more links or addresses that can be used to obtain the supplemental content (e.g., advertising) from the indicated third party provider. In connection with sending the response, the system can also log or otherwise store session data to an appropriate data store 706.

At some point after providing the content, a feedback submission can be received from the user indicating some alleged issue with the content 708, such as the detection of malicious code in an image loaded by the primary content onto a page in the user browser. The system can extract relevant information from the submission 710, including any information discussed above that can be used to help locate potential sources of the problem. As discussed, in some embodiments the information will be analyzed right away, while in other embodiments the information will be stored for subsequent analysis. At some point, the information will be analyzed to determine whether there are a significant number of occurrences of the problem with sufficient similarity 712. If not, the system can continue to serve content in response to received requests using standard procedure.

If, on the other hand, a minimum number of occurrences or minimum frequency is detected, the system can join information from the log/session data and the feedback data stores 714, and can attempt to determine and rank the likely sources of the issue 716. In some cases, the system might perform at least some preventative measures automatically to prevent further issues for other users. An authorized user can, via a designated interface, determine whether to disable or otherwise deny access to specific content 718, such as advertising or other third party content. The authorized user also can monitor reports and determine whether to enable that type of content at a later time. Various other steps can be utilized as well, in various selections and orders, within the scope of the various embodiments.

In some embodiments, a content provider can also detect the presence of malware or other such issues by monitoring the occurrence of particular problems with users, internal systems, etc. For example, if specific components are repeatedly crashing or performing slowly, such information can trigger an investigation. In some embodiments, a company providing a browser application might log information for browser problems experienced by users, which could be received by the provider. In some embodiments a provider can include code or active scripts that monitor aspects such as user activity and behavior, the time various aspects take to load or complete, etc. A virtual "trip wire" can be coded into a page such that if someone attempts to modify a portion of a page, the underlying DOM or HTML, etc., an investigation can be triggered or action taken. In some embodiments, policies can be utilized that specify allowed and/or forbidden behavior, and any un-allowed behavior can result in an investigation or action. Any time an unusual occurrence is detected with regularity or at least with a minimal number of instances, an investigation can be triggered.

In some embodiments, an anti-virus company can provide notifications when specific problems are detected by software on various user machines. In some cases, either the anti-virus company or content provider can trigger an investigation at either entity. Data can be passed that is stripped of user-identifying information for purposes of data privacy, etc. A content provider can provide an externally-facing API or other such interface enabling entities such as anti-virus companies or third party providers to request specific information useful in viewing reports, identifying problems, etc. In some embodiments, an anti-virus company can be notified of a problem, whereby the company can notify relevant users that they should scan their systems for specific problems, or perform other such actions. In some embodiments, the company can return results to the content provider after the user scans to assist in future determinations, etc.

In certain embodiments, various aspects can be provided as a service to other parties. For example, an entity can provide log or other user data continually, at regular intervals, as needed, etc. The entity could pay to store the data for a period of time, or until a specified amount of space is full, etc. The entity also could remove any specific identifying information before sending the data. The service then could analyze the data as discussed above, and return reports or other information identifying potential sources of problems, etc.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method implemented on a server in a communications network for identifying a third party content provider, the method comprising the steps of:
    receiving feedback information that references electronic content that is able to be presented through a primary content provider, wherein the feedback information indicates that malicious content was received with the electronic content, the electronic content having been received from the third party content provider and the electronic content not being accessible by the primary content provider, wherein the feedback information includes at least one piece of identifying information associated with a user device that was exposed to the electronic content; determining that the feedback information satisfies at least one criterion by receiving a threshold number of notifications indicating that the malicious content was received with the electronic content;
    identifying the third party content provider based at least in part on common attributes included in session information associated with the user device and in the at least one piece of identifying information; and
    initiating an action with respect to at least one of the electronic content or the third party content provider to prevent the electronic content and the malicious content from being presented through the primary content provider.

2. The method of claim 1, wherein the method further comprises:
    sending a notification to the third party content provider indicating that the malicious content was received with the electronic content.

3. The method of claim 1, wherein the at least one piece of identifying information includes at least one of: a user or session identifier (ID), a timestamp, an Internet Protocol address, a portion of a uniform resource locator (URL) of a page being to which the user device was exposed, or identification of a source of supplemental content displayed to the user.

4. The method of claim 1, wherein initiating an action with respect to at least one of the electronic content or the third party content provider further comprises:
    restricting content from the third party provider from being selected for presentation through the primary content provider.

5. An electronic device configured to communicate with a communications network, comprising:
    one or more processors;
    memory configured to store machine readable instructions that, when executed by the one or more processors, cause the electronic device to perform the operations of:
        receiving information that is associated with electronic content, wherein the information indicates that malicious content was received with the electronic content, the electronic content having been received from a third party content provider and the electronic content not being accessible by the primary content provider, wherein the information includes at least one piece of identifying information associated with a user device that was exposed to the electronic content;
        determining that the received information satisfies at least one criterion by determining that a threshold number of notifications have been received, each notification indicating that the malicious content was received with the electronic content;

identifying the third party content provider based at least in part on common attributes included session information associated with the user device and in the at least one piece of identifying information; and initiating an action with respect to at least one of the electronic content or the third party content provider to prevent the electronic content and the malicious content from being presented through the primary content provider.

6. The electronic device of claim 5, wherein determining that the received information satisfies at least one criterion cause the electronic device to perform the operations of:

determining that a rate of notifications being received satisfy a threshold rate of reporting, each notification indicating that the malicious content was received with the electronic content.

7. The electronic device of claim 5, wherein the memory further includes instructions that, when executed by the one or more processors, cause the electronic device to perform the operations of:

receiving a notification indicating that the malicious content is no longer being sent from the third party content provider; and allowing content from the third party provider to be selected for presentation through a primary content provider.

8. The electronic device of claim 5, wherein the memory further includes instructions that, when executed by the one or more processors, cause the electronic device to perform the operations of:

determining a likelihood that an electronic device has been exposed to the malicious content provided by the third party content provider; and sending a notification to the electronic device indicating the likelihood that the electronic device was exposed to the malicious content provided by the third party content provider.

9. The electronic device of claim 5, wherein the at least one piece of identifying information includes at least one of: a user or session identifier (ID), a timestamp, an Internet Protocol address, a portion of a uniform resource locator (URL) of a page being to which the user device was exposed, or identification of a source of supplemental content displayed to the user.

10. The electronic device of claim 5, wherein the memory further includes instructions that, when executed by the one or more processors, cause the electronic device to perform the operations of:

determining at least one different user device that received the malicious content; and sending a notification to the at least one different user device indicating that the malicious content was received from the third party.

11. The electronic device of claim 5, wherein initiating an action with respect to at least one of the electronic content or the third party content provider cause the electronic device to perform the operations of:

restricting content from the third party provider from being selected for presentation through a primary content provider.

12. A non-transitory computer readable memory medium configured for storing one or more instructions, which when executed by one or more processors cause an electronic device to perform the operations of:

receiving feedback information that references an electronic content that is able to be presented through a primary content provider, wherein the feedback information indicates that malicious content was received with the electronic content, the electronic content having been received from a third party content provider and the electronic content not being accessible by the primary content provider, wherein the feedback information includes at least one piece of identifying information associated with a user device that was exposed to the electronic content;

determining that the feedback information satisfies at least one criterion by receiving a threshold number of notifications indicating that the malicious content was received with the electronic content;

identifying the third party content provider based at least in part on common attributes included in session information associated with the user device and in the at least one piece of identifying information; and performing an action with respect to at least one of the electronic content or the third party content provider to prevent the electronic content and the malicious content from being presented through the primary content provider.

13. The non-transitory computer readable memory medium of claim 12, wherein the feedback information indicates that the malicious content was received by the user device along with the electronic content, and wherein the one or more instructions, which when executed by one or more processors, further cause the electronic device to perform the operations of:

sending a notification to the third party content provider indicating that the malicious content was received with the electronic content.

14. The non-transitory computer readable memory medium of claim 12, wherein the at least one piece of identifying information includes at least one of: a user or session identifier (ID), a timestamp, an Internet Protocol address, a portion of a uniform resource locator (URL) of a page being to which the user device was exposed, or identification of a source of supplemental content displayed to the user.

15. The non-transitory computer readable memory medium of claim 12, wherein performing an action with respect to at least one of the electronic content or the third party content provider further comprises:

restricting content from the third party provider from being selected for presentation through the primary content provider.

16. The non-transitory computer readable memory medium of claim 12, wherein the one or more instructions, which when executed by one or more processors, further cause the electronic device to perform the operations of:

receiving a notification indicating that the malicious content is no longer being sent from the third party content provider; and allowing content from the third party provider to be selected for presentation through the primary content provider.

17. The non-transitory computer readable memory medium of claim 12, wherein the one or more instructions, which when executed by one or more processors, further cause the electronic device to perform the operations of:

determining a likelihood that an electronic device has been exposed to the malicious content provided by the third party content provider; and sending a notification to the electronic device indicating the likelihood that the electronic device was exposed to the malicious content provided by the third party content provider.

* * * * *